United States Patent
Li et al.

(10) Patent No.: US 11,934,949 B2
(45) Date of Patent: Mar. 19, 2024

(54) COMPOSITE BINARY DECOMPOSITION NETWORK

(71) Applicant: Intel Corporation, Santa Clara, CA (US)

(72) Inventors: Jianguo Li, Beijing (CN); Yurong Chen, Beijing (CN); Zheng Wang, Beijing (CN)

(73) Assignee: INTEL CORPORATION, Santa Clara, CA (US)

(*) Notice: Subject to any disclaimer, the term of this patent is extended or adjusted under 35 U.S.C. 154(b) by 456 days.

(21) Appl. No.: 16/973,608

(22) PCT Filed: Sep. 27, 2018

(86) PCT No.: PCT/CN2018/107886
§ 371 (c)(1),
(2) Date: Dec. 9, 2020

(87) PCT Pub. No.: WO2020/061884
PCT Pub. Date: Apr. 2, 2020

(65) Prior Publication Data
US 2021/0248459 A1   Aug. 12, 2021

(51) Int. Cl.
*G06N 3/08* (2023.01)
*G06N 3/044* (2023.01)
(Continued)

(52) U.S. Cl.
CPC ............... *G06N 3/08* (2013.01); *G06N 3/044* (2023.01); *G06N 3/045* (2023.01); *G06N 3/063* (2013.01); *G06N 3/084* (2013.01)

(58) Field of Classification Search
CPC ........ G06N 20/00; G06N 20/10; G06N 20/20; G06N 3/02; G06N 3/04; G06N 3/044;
(Continued)

(56) References Cited

U.S. PATENT DOCUMENTS

| 10,032,110 B2 | 7/2018 | Young et al. |
| 2014/0122586 A1* | 5/2014 | Kao ........................ G06Q 50/01 709/204 |

(Continued)

FOREIGN PATENT DOCUMENTS

| CN | 106816147 A | 6/2017 |
| CN | 108334945 A | 7/2018 |

(Continued)

OTHER PUBLICATIONS

Notification of Transmittal of the International Search Report and the Written Opinion of the International Searching Authority for PCT Application No. PCT/CN2018/107886, dated Jun. 26, 2019, 9 pages.

(Continued)

*Primary Examiner* — Shane D Woolwine
(74) *Attorney, Agent, or Firm* — JAFFERY WATSON MENDONSA & HAMILTON LLP

(57) ABSTRACT

Embodiments are directed to a composite binary decomposition network. An embodiment of a computer-readable storage medium includes executable computer program instructions for transforming a pre-trained first neural network into a binary neural network by processing layers of the first neural network in a composite binary decomposition process, where the first neural network having floating point values representing weights of various layers of the first neural network. The composite binary decomposition process includes a composite operation to expand real matrices or tensors into a plurality of binary matrices or tensors, and a decompose operation to decompose one or more binary matrices or tensors of the plurality of binary matrices or tensors into multiple lower rank binary matrices or tensors.

25 Claims, 13 Drawing Sheets

(51) Int. Cl.
*G06N 3/045* (2023.01)
*G06N 3/063* (2023.01)
*G06N 3/084* (2023.01)

(58) Field of Classification Search
CPC .......... G06N 3/045; G06N 3/063; G06N 3/08; G06N 3/082; G06N 3/084
See application file for complete search history.

(56) References Cited

U.S. PATENT DOCUMENTS

2016/0174902 A1* 6/2016 Georgescu ........... G06V 10/454 600/408
2017/0286830 A1 10/2017 El-Yaniv et al.

FOREIGN PATENT DOCUMENTS

| | | |
|---|---|---|
| EP | 3857460 A | 8/2021 |
| KR | 10-2021-0064109 A | 6/2021 |
| WO | 2020061884 A1 | 4/2020 |

OTHER PUBLICATIONS

Hyeonuk, Kim, et al., "A Kernel Decomposition Architecture for Binary-Weight Convolutional Neural Networks" 2017 54th ACM/EDAC/IEEE Design Automation Conference, Jun. 22, 2017.
Courbariaux, M., Hubara, I., Soudry, D., El-Yaniv, R., & Bengio, Y. (2016). Binarized Neural Networks: Training Neural Networks withWeights and Activations Constrained to +1 or −1. ArXiv:1602.02830v3 [cs.LG] Mar. 17, 2016, 1-11.
Courbariaux, M., Bengio, Y., & David, J. (2016). BinaryConnect: Training Deep Neural Networks with binary weights during propagations. ArXiv:1511.00363v3 [ Cs.LG] Apr. 18, 2016, 1-9.
Li, F., Zhang, B., & Liu, B. (2016). Ternary weight networks. ArXiv:1605.04711v2 [cs.CV] Nov. 19, 2016, 1-5.
Hou, L., Yao, Q., & Kwok, J. (2017). Loss-Aware Binarization of Deep Networks. arXiv:1611.01600v3 [cs.NE] May 10, 2018, 1-11.
Jaderberg, M., Vedaldi, A. & Zisserman, A. (2014) Speeding up Convolutional Neural Networks with Low Rank Expansions. Visual Geometry Group, Department of Engineering Science, University of Oxford, Oxford UK. 1-13.
Liu, W., Anguelov, D., Erhan, D., Szegedy, C., Reed, S., Fu, C. & Berg, A. SSD: Single Shot MultiBox Detector. In ECCV, 2016. 1-17.
Rastegari, M., Ordonez, V., Redmon, J. & Farhadi, XNOR-Net: ImageNet Classification Using Binary Convolutional Neural Networks. ECCV 2016, 1-55.
K. Simonyan, A. Zisserman. Very Deep Convolutional Networks for Large-Scale Image Recognition. ICLR, 2015. 1-14.
Courbariaux Matthieu et al: "BinaryNet: Training Deep Neural Networks with Weights and Activations Constrained to +1 or −1", Feb. 9, 2016 (Feb. 9, 2016), Retrieved from the Internet: URL: https://arxiv.org/pdf/1602.02830v1.pdf [retrieved on Oct. 15, 2021].
Extended European Search Report for European Patent Application No. 18935853.4 dated Mar. 25, 2022, 11 pages.
Kim Minje et al: "Bitwise Neural Networks for Efficient Single-Channel Source Separation", 2018 IEEE International Conference On Acoustics, Speech and Signal Processing (ICASSP), IEEE, Apr. 15, 2018 (Apr. 15, 2018), pp. 701-705.
Li Zefan et al: "Performance Guaranteed Network Acceleration via High-Order Residual Quantization", 2017 IEEE International Conference on Computer Vision (ICCV), IEEE, Oct. 22, 2017 (Oct. 22, 2017), pp. 2603-2611.

\* cited by examiner

Algorithm – Binary Matrix Decomposition and Rank Estimation

Input: binary weight matrix $A$
    Output: matrix rank $r$, matrices $B$, $C$ ($A = BC$)
1:     function MATRIXFACTORIZATION($A$)
2:         if $A.height \leq A.width$ then
3:             $A \leftarrow A^T$
4:             *transpose = True*
5:         end if
6:         $B \leftarrow$ identity matrix $A.height * A.height$
7:         $r \leftarrow 0$
8:         for *column* $\leftarrow 1$ to $A.width$ do do
9:             $l \leftarrow$ first row satisfying constraints: $A[l, column] = 1$ and $l \geq r + 1$
10:            Reverse row $l$ with row $r + 1$, $P \leftarrow$ corresponding transition matrix
11:            $r \leftarrow r + 1$
12:            $B \leftarrow B * P^{-1}$
13:            for *row* $\leftarrow r + 1$ to $A.height$ do do
14:                if $A[row, column] > 0$ then
15:                    $A[row,:] \leftarrow (A[r,:] + A[row,:])$ mod 2
16:                    $P \leftarrow$ corresponding transition matrix
17:                    $B \leftarrow B * P^{-1}$
18:                end if
19:            end for
20:         end for
21:         $C \leftarrow$ first $r$ rows of $A$
22:         $P \leftarrow$ first $r$ rows are identity matrix, other $A.height - r$ rows are zeros
23:         $B \leftarrow B * P$
24:         if *transpose* then
25:             Return $r$, $C^T$, $B^T$
26:         else
27:             Return $r$, $B$, $C$
28:         end if
29:     end function

*FIG. 5*

COMPOSITE BINARY DECOMPOSITION NETWORK

CLAIM OF PRIORITY

This patent application, under 35 U.S.C. § 371, claims the benefit of and priority to International Application No. PCT/CN2018/107886, by Jianguo Li, et al., entitled COMPOSITE BINARY DECOMPOSITION NETWORK, filed Sep. 27, 2018, the disclosure of which is incorporated herein by reference in its entirety.

TECHNICAL FIELD

Embodiments described herein generally relate to the field of computing systems and, more particularly, a composite binary decomposition network (CBDNet) for efficient deep learning neural networks such as convolution neural network model compression and inference speedup.

BACKGROUND

A deep neural network (DNN), as applied in deep learning operations, is an artificial neural network that includes multiple neural network layers. Deep neural networks have been utilized to provide significant breakthroughs in many technological domains, including computer vision, audio/speech recognition, autonomous driving, and others. It is expected that the application of deep neural networks will continue to expand into new technology areas.

However, deep learning-based systems suffer from certain limitations, and in particular have large memory and computing power requirements. In an example of visual recognition, a very-deep neural network, such as the VGGNet convolutional neural network (CNN), commonly has a model size that is greater than 500 MB and computing requirement of greater than 15G FLOPs (Floating Point Operations per Second).

The memory and computing power requirements of deep neural networks limitation hinder the deployment of new deep learning techniques and applications. In particular, these requirements limit the expansion of deep neural networks into low-end or embedded processors, and thus creates difficulties in expanding new applications into smaller and lower cost computing devices or embedded computing devices.

BRIEF DESCRIPTION OF THE DRAWINGS

Embodiments described here are illustrated by way of example, and not by way of limitation, in the figures of the accompanying drawings in which like reference numerals refer to similar elements.

FIG. 5 illustrates exemplary pseudo-code of an executable composite binary decomposition computer algorithm for a composite binary decomposition network generation according to some embodiments;

DETAILED DESCRIPTION

Figure 1A:
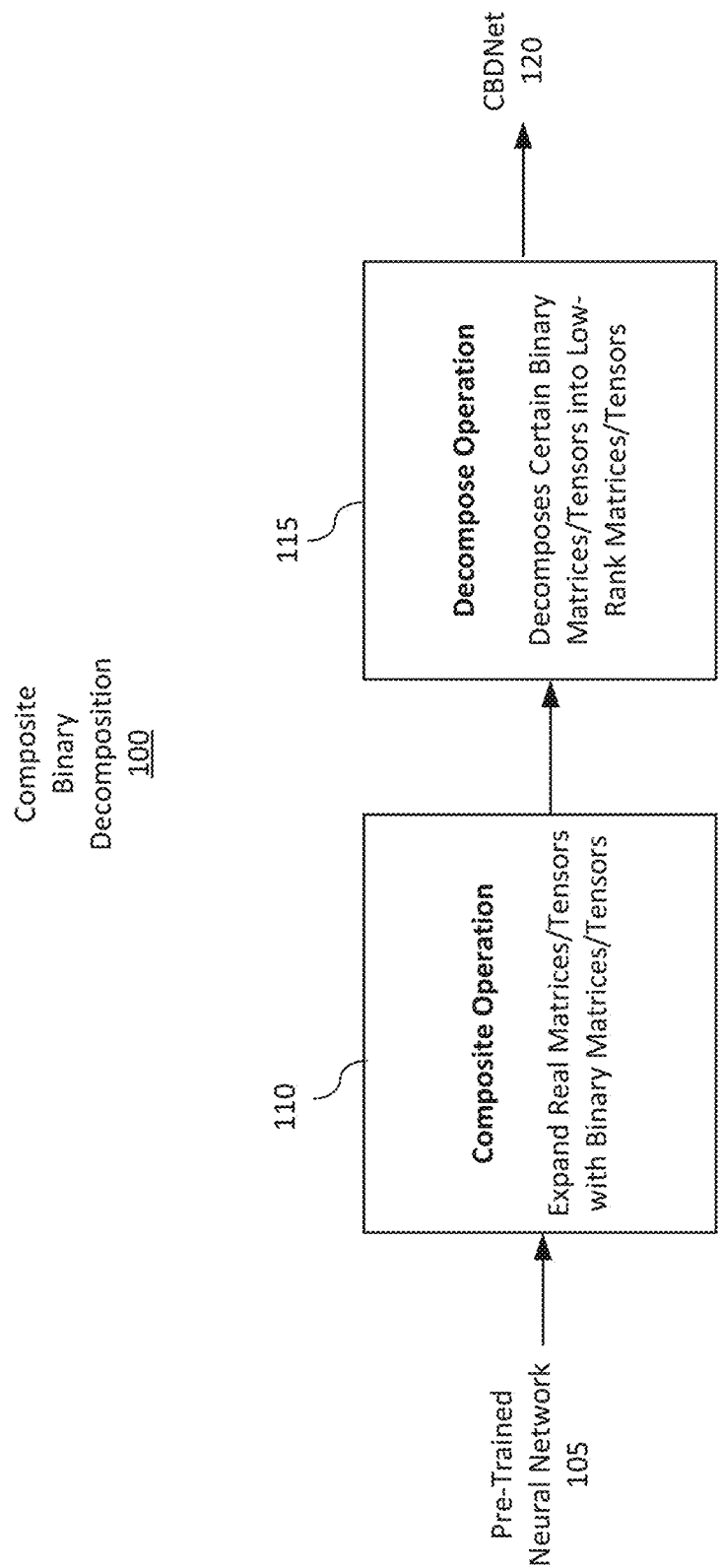
FIG. 1A is an illustration of composite binary decomposition of a neural network according to some embodiments.

Embodiments described herein are directed to a composite binary decomposition network.

In some embodiments, an apparatus, system, or process provides for generation of a composite binary decomposition network (CBDNet) from a pre-training a deep neural network such as CNN. For example, with a pre-trained network without training set, a composite binary decomposition operation provides for generation of a CBDNet without requiring network training or fine-tuning. In some embodiments, the apparatus, system, or process is to transfer pre-trained floating-point models, such as FP32 (32-bit floating point, referred to as single-precision binary floating-point format) models, into multi-bit binary models in a training-free fashion for efficient model compression and inference speedup with binary operations.

Certain existing technologies have been developed to address the issues of large model size and high computing cost in deep neural networks. For example, binary neural networks with binary operations can provide improvements in speed and model compression over a floating-point counterpart. However, the existing solutions for binary neural network conversion are training or fine-tuning based solutions, and such solutions may suffer from the following disadvantages:

(1) A full training set for the neural network is required for model training or for model fine-tuning;

(2) A training procedure for low-bit networks is usually much slower (commonly 3~10 times slower) in convergence than a floating-point training procedure; and (3) Large accuracy losses (such as 5%~30% losses in accuracy) in neural network inference operation commonly result when all layers of a neural network are transferred into low-bit cases for a neural network model. Advanced and complex techniques (such as loss-aware binarization) are then required to maintain sufficient accuracy in the model.

In some embodiments, a CBDNet network provides an alternative solution that provides speed and model compression improvements over floating point operations, while avoiding the significant accuracy losses of existing binary solutions. In some embodiments, a composite binary decomposition apparatus, system, or process is to transform pre-trained floating-point neural network models, such as floating-point CNN models, into multi-bit binary network models for efficient model compression and inference speedup in a training-free fashion.

In some embodiments, composite binary decomposition first composites or expands a floating-point weight tensor W of a pre-trained deep learning model into a set of binary tensors $A_i$ ($W=\Sigma_i A_i 2^{-i}$). Certain sparse binary tensors $A_i$ may be further spatially decomposed into two smaller (low-rank) binary tensors $B_i$ and $C_i$, where $A_i=B_i*C_i$. (Sparsity of a matrix refers to the proportion of elements in the matrix that are zero, wherein sparsity may be defined as the number of zero-valued elements of the matrix divided by the total number of elements of the matrix, i.e., a sparse ratio, or other similar measure of the number of zero-valued elements in a matrix.) The resulting CBDNet can provide neural network inference with multi-bit (such as 3~5 bits) binary operations instead of floating-point operations, thus yielding model size compression together with improvements in inference speed.

In some embodiments, an apparatus or system includes hardware configured to support CBDNet models to provide further improvements in efficiency of inference. In some embodiments, the hardware supports dedicated binary or bitwise operations/instructions for the generated CBDNet model.

In some embodiments, a composite binary decomposition apparatus, system, or process is to expand floating-point weights into J-bit (for example, J=7) binary networks. The composite binary decomposition from 8-bit network operations in at least the following aspects:

(1) The CBDNet supports binary operations for each bit-plane (a bit-plane in general being a set of bits corresponding to a particular bit position in each binary number representing an image, such as, for example a single channel 8-bit gray image being represented as an 8-channel binary image, with each channel being a bit-plane), while an 8-bit network performs int8 operations as a whole.

(2) For certain bit-planes, CBDNet supports binary spatial decomposition to factorize a matrix into two lower rank matrices (for example, a first matrix being vertically dominate, and a second matrix being horizontally dominate), such that the parameter size and computing cost in the bit-planes are greatly reduced for total model compression and computing speedup.

In some embodiments, in contrast with existing techniques for floating-point low-rank matrix/tensor decomposition, CBDNet performs binary matrix/tensor decomposition in bit-planes level for CNN compression and speedup. The binary matrix/tensor decomposition of the CBDNet thus provides significant improvements over floating point operations.

Further, CBDNet provides multiple advantages over conventional training/fine-tuning based low-bit neural networks, including the following:

(1) CBDNet is a training or fine-tuning free solution, and thus CBDNet is operable for legacy and modern CNN network structures without training-set requirements;

(2) CBDNet is based on mathematic factorization such that a full processing operation may be performed on a pre-trained CNN model within a relatively short time (for example, time periods in tens of minutes), which is very fast in comparison with training/fine-tuning based solutions;

(3) A CBDNet model has only negligible inference accuracy losses in comparison to FP32 CNN model operations, while existing training/fine-tuning based low-bit methods generally suffer significant losses in inference accuracy; and (4) A CBDNet model can replace FP32 CNN models with 3~5 bits binary CNN models, which can result is 6~10× model-size compression and corresponding 6~10× speed improvement with binary operation supported hardware.

Certain technologies have been developed for compression and acceleration of DNNs. In particular, low-bit deep neural networks attempt to replace weights (or activations) in neural networks with binary or ternary values. However, such technologies suffer from significant accuracy losses.

In some embodiments, the CBDNet provides weights of {0,1}, with activation being {0,1} or real, and operations being bitwise with hardware support. In contrast with conventional technologies, the CBDNet can provide a less than one percent loss in accuracy.

FIG. 1A is an illustration of composite binary decomposition of a neural network according to some embodiments. In some embodiments, composite binary decomposition provides a training and fine tuning free solution to deep neural network memory and computing requirements, allowing for transformation of a CNN into an efficient and accurate binary network.

As illustrated in FIG. 1A, an apparatus, system, or process is to receive or otherwise obtain a pre-trained floating-point valued neural network 105, and to perform two major composite binary decomposition operations to transform the pre-trained floating-point valued neural network 105 into a composite binary decomposition network (CBDNet) 120:

(1) A composite operation 110 that expands real matrices/tensors, e.g., weight tensor W, into multiple binary matrices/tensors, e.g., a set of binary tensors, $A_i$ ($W=\Sigma_i A_i 2^{-i}$); and (2) A decompose operation 115 that decomposes certain binary matrices/tensors into multiple (such as two) low-rank matrices/tensors, e.g., binary tensors $B_i$ and $C_i$, where $A_i=B_i*C_i$.

Figure 1B:
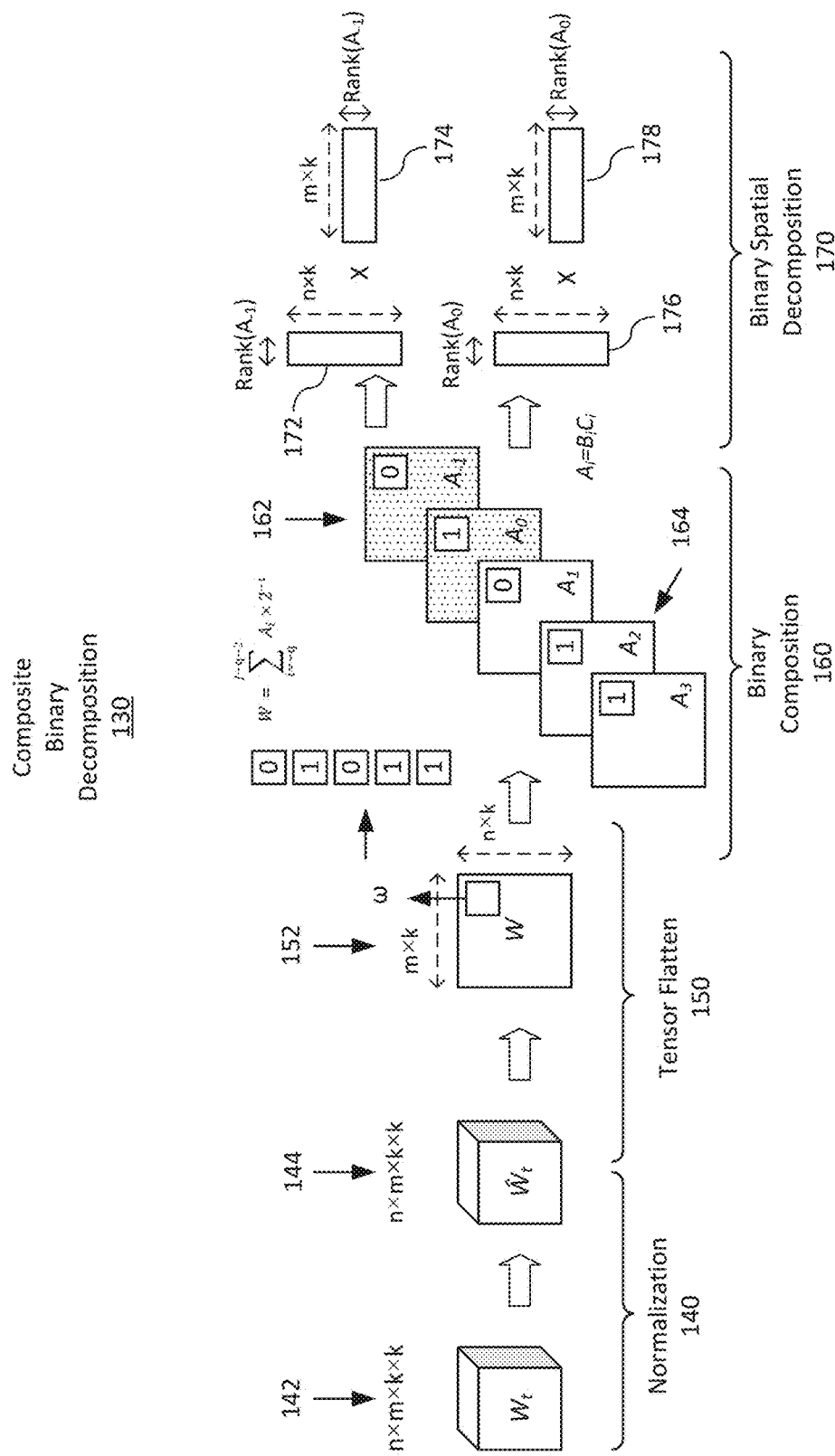
FIG. 1B is an illustration of details for generation of a composite binary decomposition network (CBDNet) according to some embodiments.

In some embodiments, the CBDNet operations illustrated in FIG. 1A include the details illustrated in FIG. 1B.

FIG. 1B is an illustration of details for generation of a composite binary decomposition network according to some embodiments. In some embodiments, an apparatus, system, or process is to perform composite binary decomposition operations 130 to transform a pre-trained floating-point valued neural network into a CBDNet network, the operations including one or more of the following:

Normalization 140: For a pre-trained neural network model, a tensor normalization operation is performed layer-by-layer through the neural network. For a t-th layer of the neural network, it is assumed there is a weight tensor $W_t$ 142 with size $n*k^2*m$, where n is the number of input channels, m is the number of output channels, and $k^2$ is the 2D spatial convolution kernel size. To realize real to binary tensor expansion or composition, the tensor normalization operation causes each element to fall within a range of [−1, 1] by dividing each element by the maximum absolute element value in the tensor, as shown in Equation [1], to generate normalized weight tensor $\hat{W}_t$ tensor 144:

$$\hat{W}_t = W_t / w_{max}, \text{ where } w_{max} = \max_{w_i \in W_t} |w_i| \qquad [1]$$

Tensor Flattening 150: In some embodiments, tensor $\hat{W}_t$ is flattened into matrix W 152 to simplify the analysis, where W 152 is of size $(n*k)*(k*m)$, where $n*k$ represents the number of rows and $k*m$ represents the number of columns in matrix W.

Binary Composition 160: In some embodiments, matrix W is composed into a combination of J−1 binary matrices $A_i$ plus an additional one bit for the sign of each element, as provided in Equation [2]:

$$W = S \odot \sum_{i=0}^{J-2} A_i 2^{-i} \quad [2]$$

Where S is the sign bit matrix, $\odot$ means element-wise product, and is $A_i$ a binary matrix, with all elements falling within the values {0, 1}. For J=6, the matrices $A_i$ are $A_0$, $A_1$, $A_2$, $A_3$ and $A_4$.

In some embodiments, a global scalar a may be imposed as provided in Equation [3], such that:

$$W = a * S \odot \sum_{i=-q}^{J-q-2} A_i 2^{-i} \quad [3]$$

As shown in FIG. 1B, for J=6, q=1, the matrices $A_i$ may be designated as $A_{-1}$, $A_0$, $A_1$, $A_2$ and $A_3$.

The scalar a may be utilized to select which matrices may be further decomposed, as further explained below.

Binary Spatial Decomposition 170: In operation, different $A_i$ will have varying sparsities. Some $A_i$ (illustrated as binary matrices $A_{-1}$ and $A_0$ 162) are very sparse, and may be further compressed, while other $A_i$ (illustrated as $A_1$, $A_2$, and $A_3$ 164) are less sparse. In the illustrated implementation, $A_{-1}$ is further factorized into a first binary matrix 172 (which may be a vertically dominant matrix) and a second binary matrix 174 (which may be a horizontally dominant matrix), and $A_0$ is further factorized into a first binary matrix 176 and a second binary matrix 178. In some embodiments, an apparatus, system, or process may provide for executing an algorithm for binary decomposition as illustrated in FIG. 5 to generate the CBDNet network.

Figure 2:
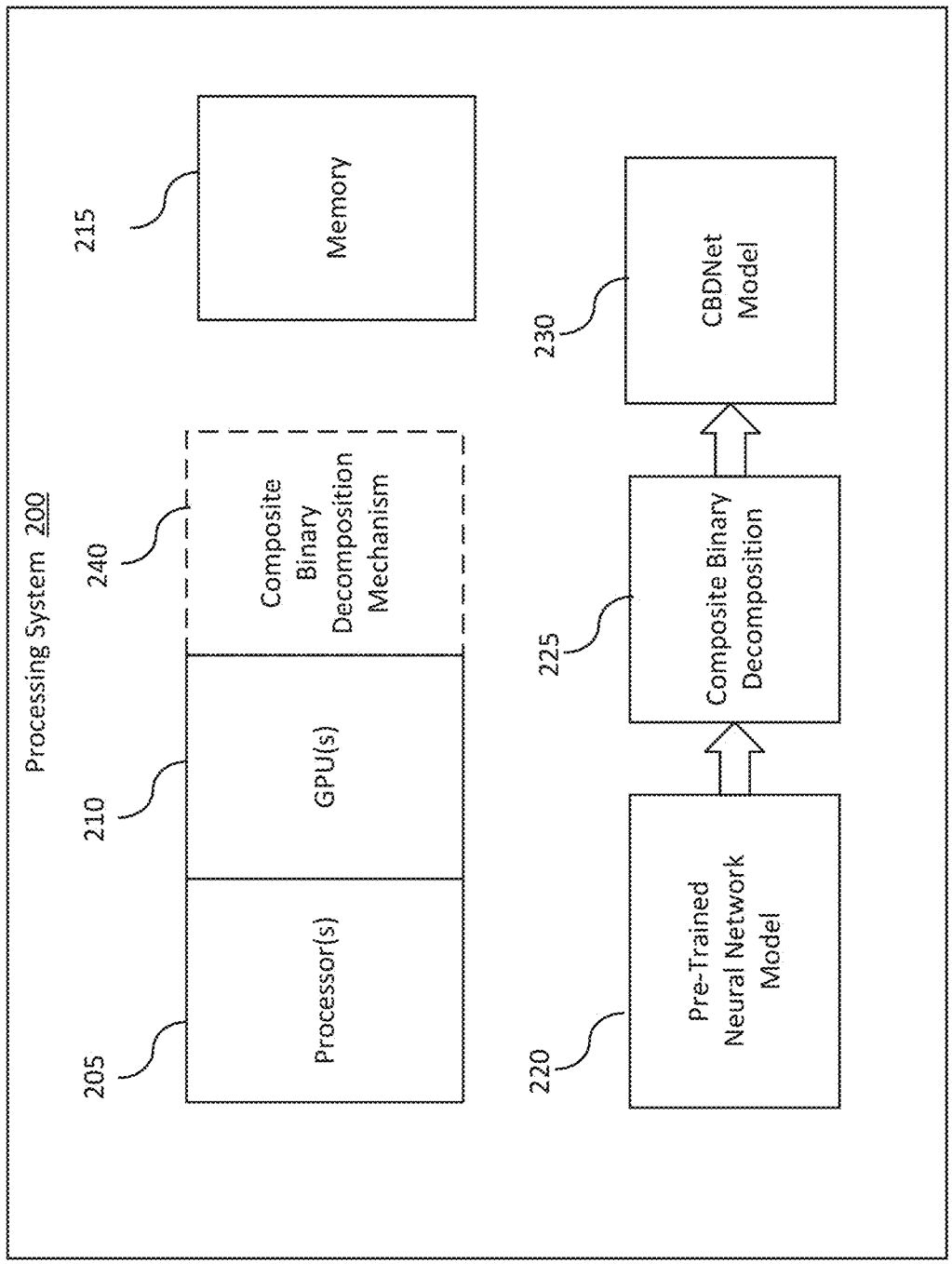
FIG. 2 is an illustration of a system or apparatus to provide for composite binary decomposition of a neural network according to some embodiments.

FIG. 2 is an illustration of a system or apparatus to provide for composite binary decomposition of a neural network according to some embodiments. In some embodiments, a processing system 200, such as processing system 600 illustrated in FIG. 6, includes one or more processor cores. In some embodiments, the processing system 200 is structured to include one or more processors 205, which may for example include one or more CPUs (Central Processing Units) (which may operate as a host processor), such as central processing unit 612 in FIG. 6, having one or more processor cores, and one or more graphics processing units (GPUs) 210, such as the graphics processing unit 614 in FIG. 6, having one or more graphics processor cores, wherein the GPUs may be included within or separate from the one or more processors 205. GPUs may include, but are not limited to, general purposed graphics processing units (GPGPUs). The processing system 200 further includes a memory 215 for the storage for data, including data for deep learning processing.

As illustrated in FIG. 2, the processing system 200 provides composite binary decomposition 225 to transform a pretrained neural network model 220, such as a CNN, into a CBDNet model 230. In some embodiments, the composite binary decomposition 225 includes the operations illustrated in FIG. 1A and FIG. 1B.

In some embodiments, the processing system optionally includes a composite binary decomposition mechanism 240 to provide support for generation or operation (or both) of a CBDNet model. In some embodiments, the composite binary decomposition mechanism 240 may be a portion of the one or more processors 205 or one or more GPUs 210, or may include a separate mechanism at least in part. In some embodiments, the composite binary decomposition mechanism 240 includes an accelerator for generation of a CBDNet model. In some embodiments, an apparatus or system includes a software-hardware design to implement a specific accelerator for CBDNet generation.

In some embodiments, a composite binary decomposition procedure may be performed utilizing a general-purpose CPU to transfer floating point models into multi-bit binary models in a training-free way. In some embodiments, hardware of the composite binary decomposition mechanism 240 may be applied to support bitwise operations to fully utilize the resulting CBDNet model for efficient inference performance. Such operations may be supported by hardware with bitwise operation support, such as a CPU, GPU, FPGA (Field Programmable Gate Array), or other processing element or system. In some embodiments, an apparatus or system may include hardware for efficient execution of a CBDNet model that has been previously generated, including generation utilizing a different apparatus or system.

It is noted that the bitwise operation is on bit-plane or channel level. The bit-plane size may be equal to the feature map size, which are usually much larger than bit-operation length so that data-level parallelization can be employed to fully utilize the bit-wise operations. For this reason, composite binary decomposition may be implemented without any waste of hardware capability.

In some embodiments, an algorithm may be utilized as a plugin for deep learning software framework for transferring floating point neural network models into multi-bit binary models.

In some embodiments, composite binary decomposition may be applied as a hardware toolchain to compile floating point neural network models into multi-bit binary models.

Figure 3:
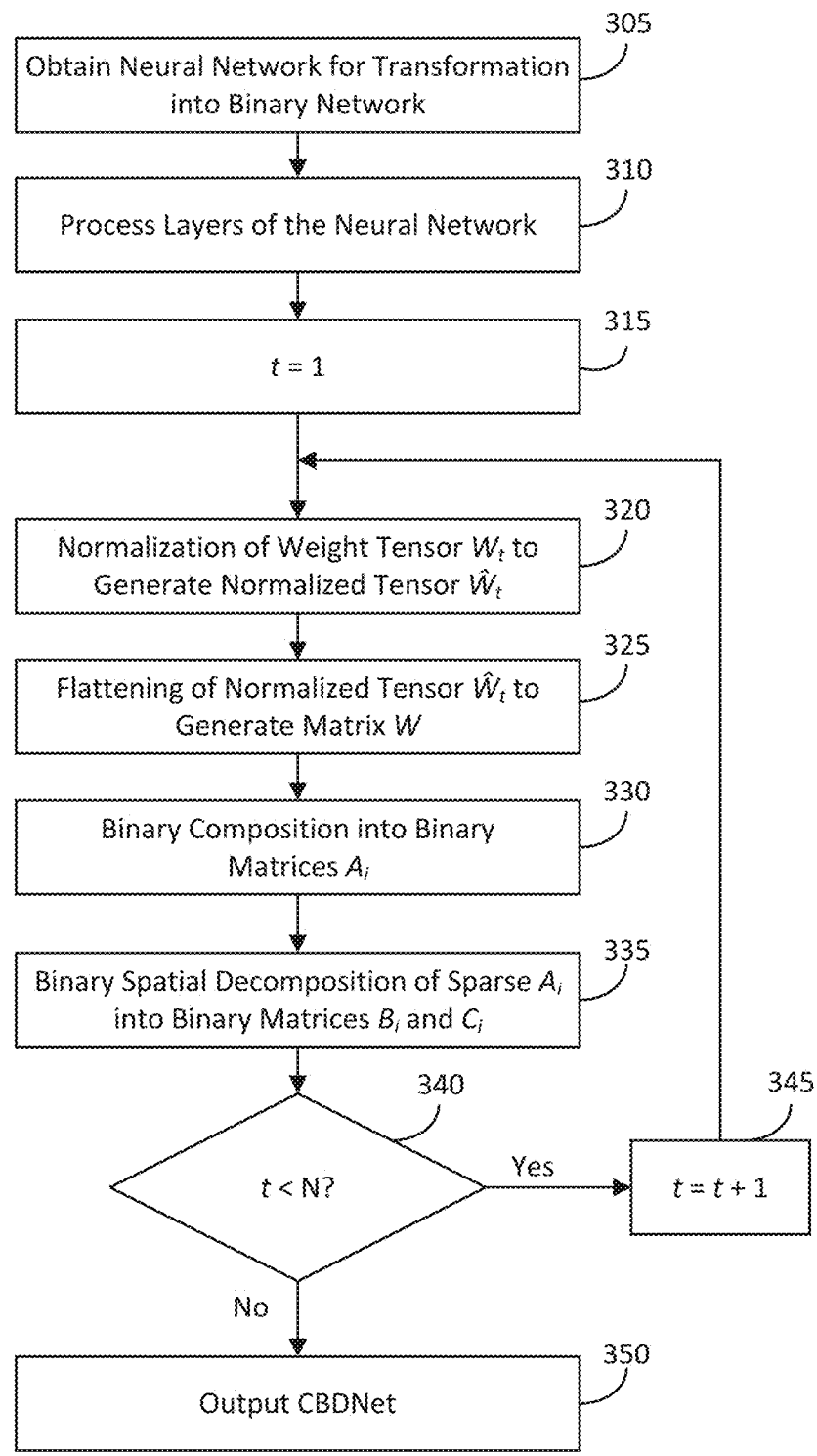
FIG. 3 is a flowchart to illustrate a process for composite binary decomposition of a neural network according to some embodiments.

FIG. 3 is a flowchart to illustrate a process for composite binary decomposition of a neural network according to some embodiments. As illustrated in FIG. 3, upon obtaining a floating-point valued neural network 305 for transformation into a binary network, layers of the neural network are processed 310. In some embodiments, the processing includes processing of every layer of the neural network.

For a first layer of N total layers, assuming, for example, at operation 315, an index commencing with t=1, the process includes normalization of weight tensor $W_t$ at operation 320 (which may have size $n*k^2*m$, where n is the number of input channels, m is the number of output channels, and $k^2$ is the 2D spatial convolution kernel size), wherein the normalization is to generate a normalized weight tensor $\hat{W}_t$ with element values falling within a range [−1, 1]. This is then followed by tensor flattening at operation 325, with normalized weight tensor $\hat{W}_t$ being flattened into a matrix W (with size $(n*k)*(k*m)$, where $n*k$ is the number of rows and $k*m$ is the number of columns).

In some embodiments, the process includes binary composition at operation 330, in which matrix W is composed into a combination of J−1 number of binary matrices $A_i$, plus additional one bit for the sign of each element of the matrix.

In some embodiments, the process further includes binary spatial decomposition at operation 335, wherein one or more sparse matrices $A_i$ are further factored in lower rank binary matrices $B_i$ and $C_i$, such that $A_i = B_i * C_i$. In some embodiments, the binary decomposition may include executing an algorithm such as illustrated in FIG. 5 to generate the CBDNet model as an output.

If there are additional layers to process, shown as a determination whether t<N at operation 340, then the index is incremented at operation 345 and returns to normalization of weight tensor $W_t$ at operation 320 for the next layer. If all layers have been processed, then the process outputs the transformed composite binary decomposition network (CBDNet) model at operation 350.

Figure 4A:
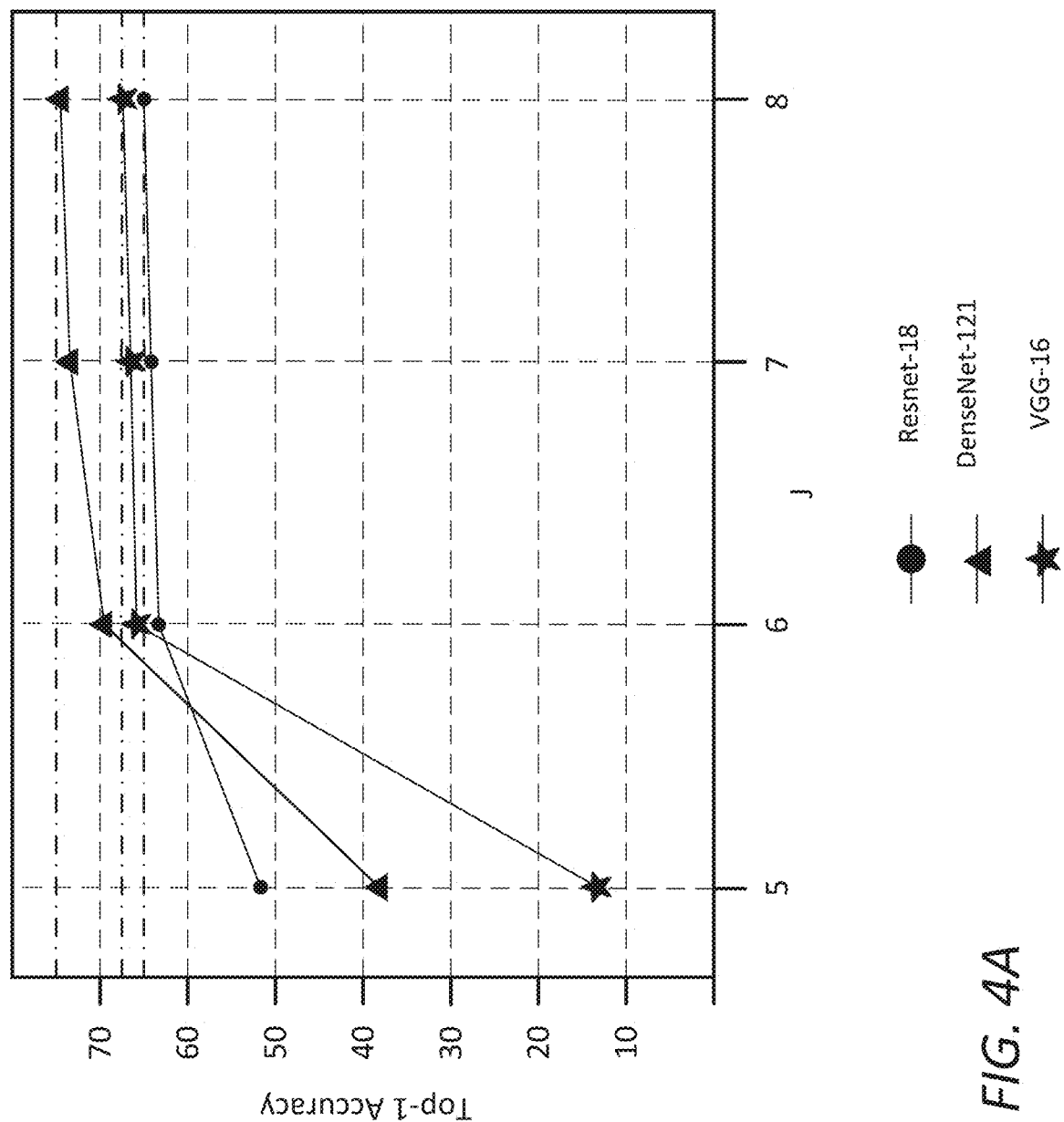
FIGS. 4A and 4B are illustrations of binary composite inference accuracy for values for a composite binary decomposition network according to some embodiments.
Figure 4B:
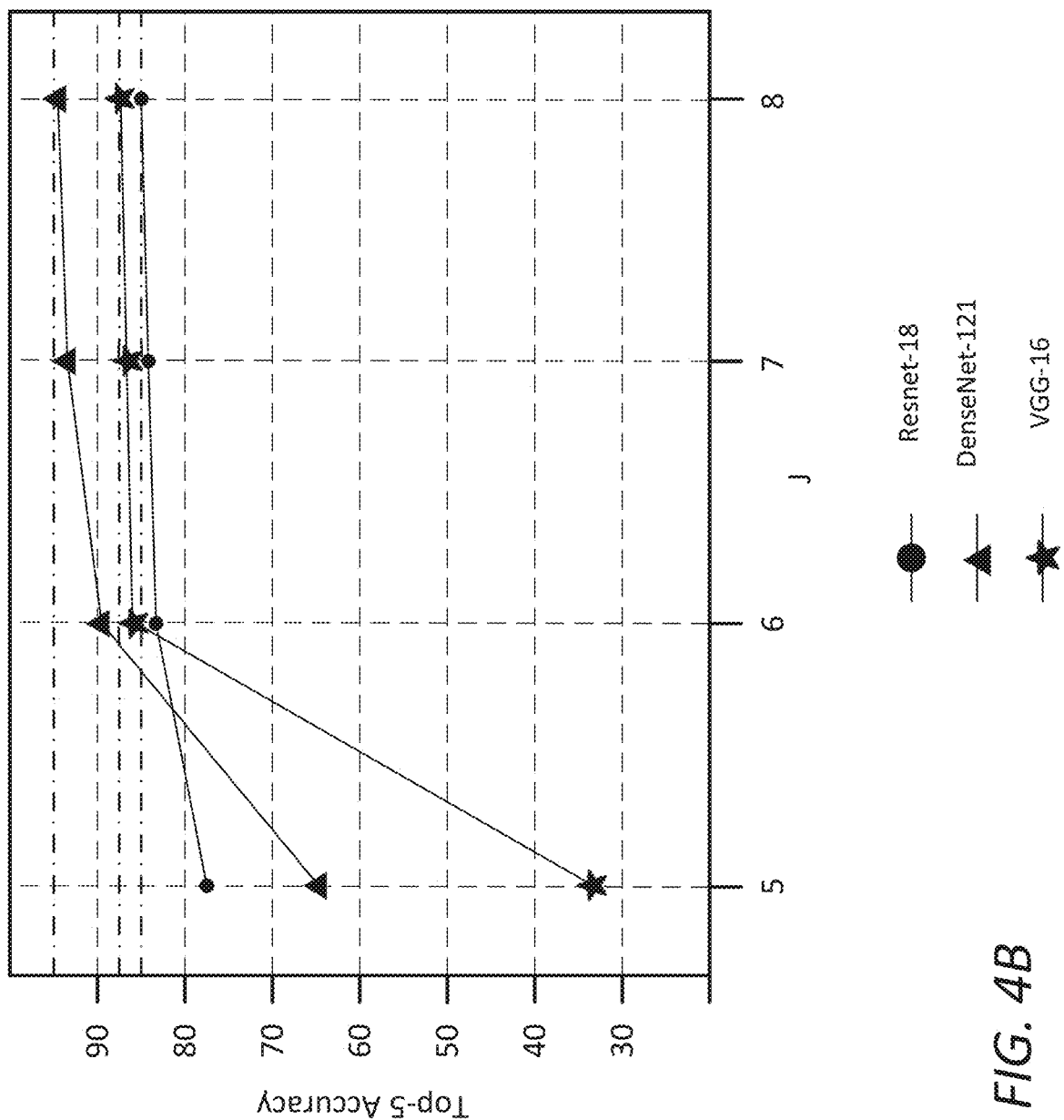

FIGS. 4A and 4B are illustrations of binary composite inference accuracy for values for a composite binary decomposition network according to some embodiments. FIG. 4A illustrates top-1 accuracy (i.e., accuracy of the top guess for a network) for varying values of J bit numbers for CBDNet transformation and FIG. 4B illustrates top-5 accuracy (i.e., accuracy top five guesses for a network) for varying values of J bit numbers for CBDNet transformation using pre-trained network models Resnet-18, DenseNet-121, and VGG-16. Also illustrated in FIGS. 4A and 4B are the FP32 convolutional network counterparts, which are shown as the dashed lines.

As demonstrated in FIGS. 4A and 4B, it is possible to approximate weights matrix W with J=7 (where J includes the sign bits) binary matrix with negligible accuracy drops compared to the FP32 models.

Figure 4C:
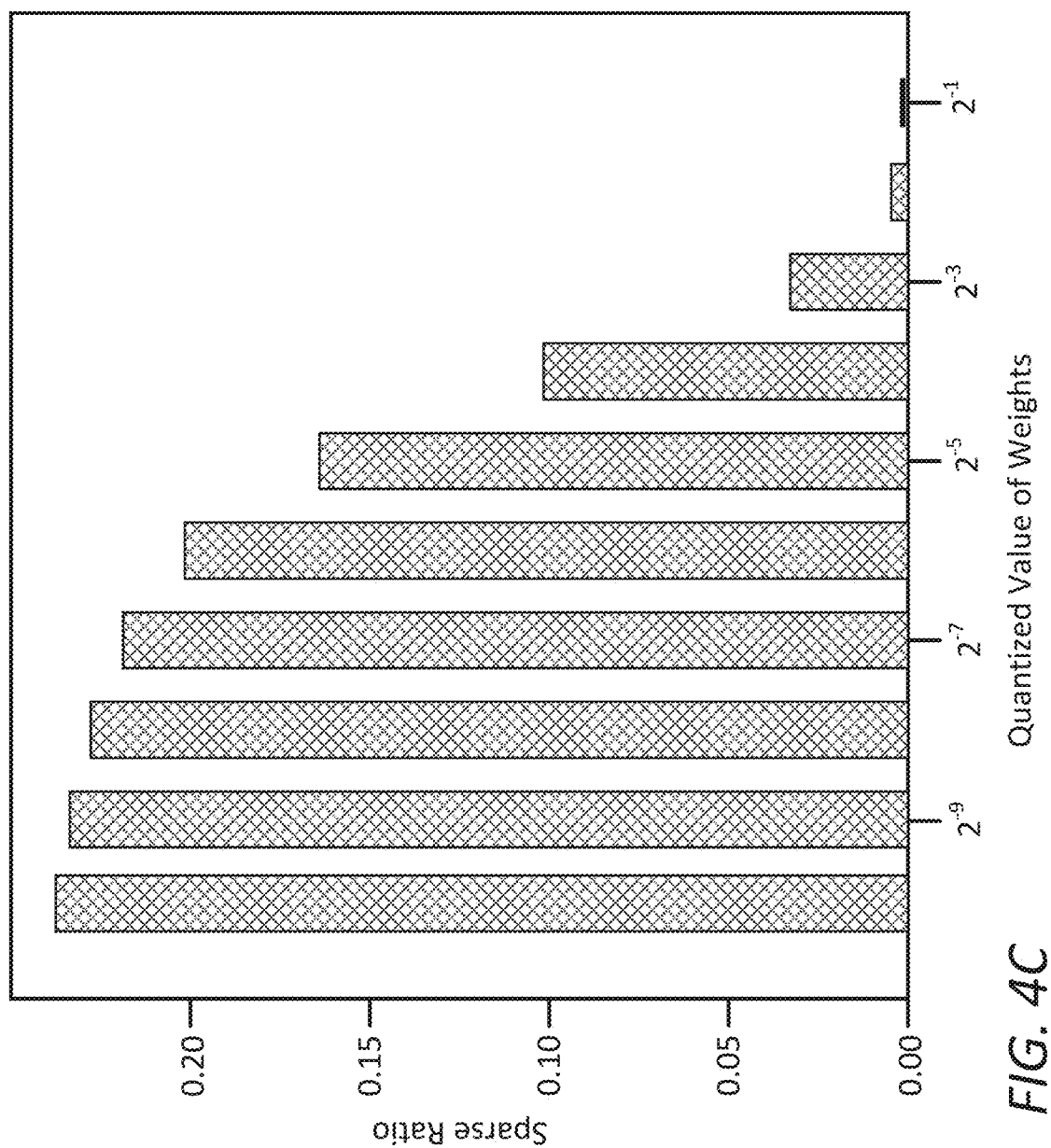
FIG. 4C is an illustration of sparseness for matrices in generation of a composite binary decomposition network according to some embodiments.

FIG. 4C is an illustration of sparseness for matrices in generation of a composite binary decomposition network according to some embodiments. As illustrated in FIG. 1B, binary matrices $A_i$ have differing sparseness, with some matrices being very sparse and thus such matrices may be further compressed. In a particular example, generating statistics for ResNet18 using the binary composition by Equation [2] results in the sparse ratio in the graph illustrated in FIG. 4C. It is shown from the graph that the first three components ($A_1$, $A_2$, $A_3$) has sparse-ratios of less than 5%, while $A_1$ is much less than 1%. The nature of the sparsity is that $A_i$ is low rank after horizontal row permutation and vertical column permutation. The further binary decomposition of $A_i$ may be expressed as follows:

If $c \geq \text{rank}(A_i)$, binary matrix $A_i \in \{0,1\}^{(nk)*(km)}$ can be losslessly factorized into two binary matrices $B_i$ and $C_i$, i.e., $A_i = B_i * C_i$, where $B_i \in \{0,1\}^{(nk)*c}$ and $C_i \in \{0,1\}^{c*(km)}$.

It may be noted that originally k*k*m*n bits were required to represent $A_i$. However, with the factorization, only c*k*(m+n) bits are required to represent $B_i$ and $C_i$. When $$c < \frac{k*m*n}{m+n},$$

there is parameter compression and speedup. The compressed bit is thus $$\frac{c*(m+n)}{k*m*n}$$

when taking $A_i$ as 1 bit.

It is further noted that $B_i$ and $C_i$ provide spatial decomposition, rather than $B_i$ vertical filters and $C_i$ horizontal filters. In contrast with certain conventional solutions, the spatial decomposition is binary, rather than full-precision.

The floating-point valued neural network to CBDNet transformation procedure provides lossless binary matrix factorization such that training or fine-tuning procedures are not required. The losses result from the composite step for removing terms smaller than $a*S*A_{J-q-2}2^{-J+q+2}$ in Equation [3].

Binary decomposition may include executing an algorithm as illustrated in FIG. 5. Because for most layers n=m, we may define $$b = \frac{2c}{k*n}$$

as the bottleneck ratio.

Figure 4D:
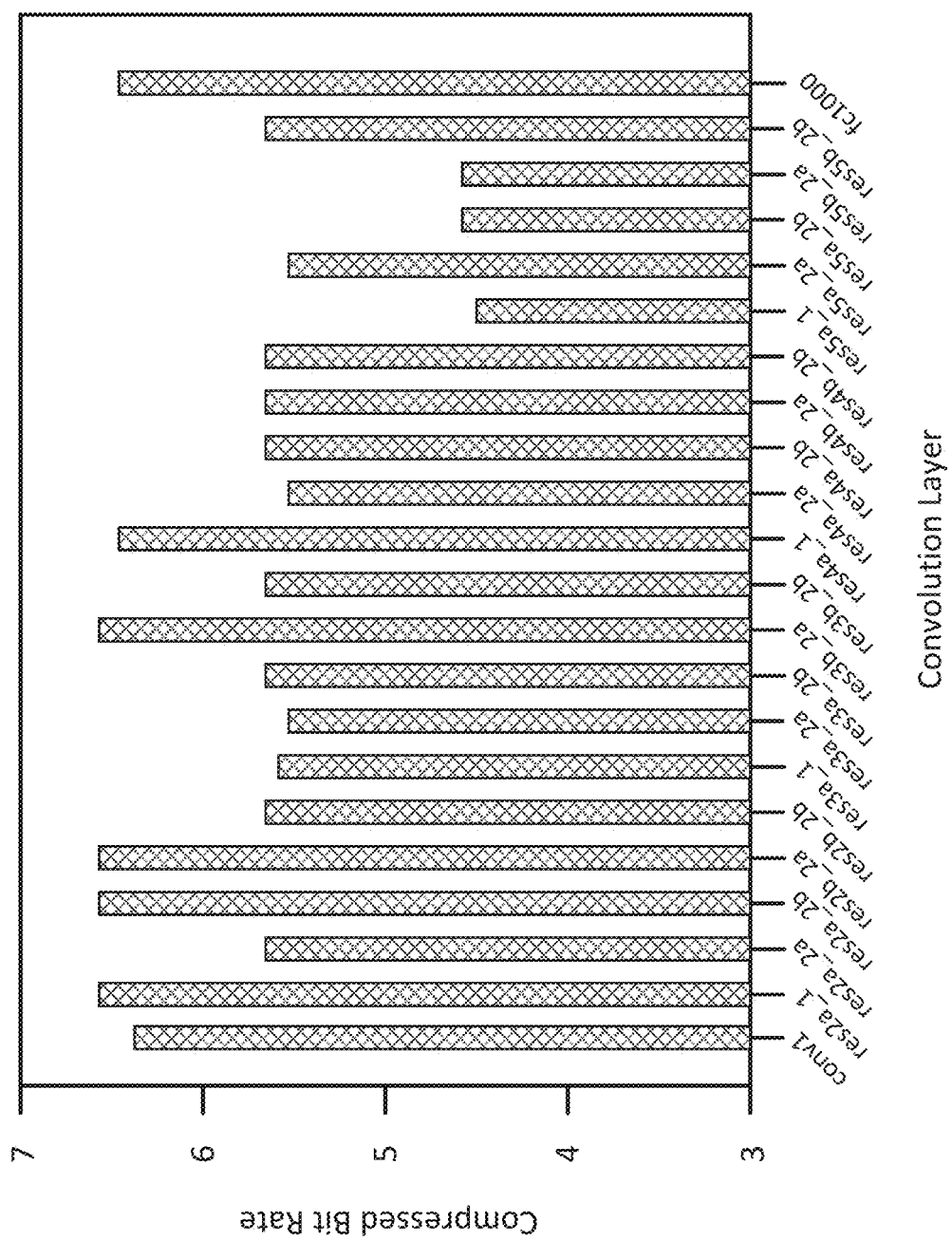
FIG. 4D is an illustration of compressed bit rate per layer for a network according to some embodiments.

FIG. 4D is an illustration of compressed bit rate per layer for a network according to some embodiments. To illustrate effectiveness of a generated CBDNet in a particular network structure and performing, for example, different vision tasks, FIG. 4D provides the compressed bit-rate (over $A_1$ and $A_2$) of each layer of the pre-trained ResNet-18. As shown, each of the layers has a compressed bit rate of less than 7 bits even with the decomposition of $A_1$ and $A_2$. This demonstrates that all layers are compressed under both $A_1$ and $A_2$. On average, ResNet-18 may be compressed to 5.46 bits with negligible accuracy drops.

Full CBDNet results on image classification network pre-trained on ImageNet, such as VGG-16, ResNet-18, and DenseNet-121, are shown in Table 3:

TABLE 3

| CBDNet on Different Network Structures with Bit Rate | | | | | |
|---|---|---|---|---|---|
| | FP32 | | CBDNet | | Bit |
| Model | Top-1 % | Top-5 % | Top-1 % | Top-5 % | Rate |
| ResNet-18 | 66.41 | 87.37 | 65.11 (−1.3) | 87.72 (−0.6) | 5.46 |
| VGG-16 | 68.36 | 88.44 | 66.9 (−1.46) | 87.52 (−0.92) | 4.38 |
| DenseNet-121 | 74.41 | 92.14 | 73.10 (−1.31) | 91.41 (−0.73) | 5.35 |

FIG. 5 illustrates an example of pseudo code of an executable composite binary decomposition computer algorithm for a composite binary decomposition network generation according to some embodiments. In some embodiments, an apparatus, system, or process may execute computer algorithm for binary matrix decomposition and rank estimation such as illustrated in the pseudo-code in FIG. 5. The algorithm operations to decompose a binary matrix $A_i$ into binary matrices $B_i$ and $C_i$, such as illustrated in the binary spatial decomposition 170 illustrated in FIG. 1B. However, embodiments are not limited to the particular algorithm provided in FIG. 5.

System Overview

Figure 6:
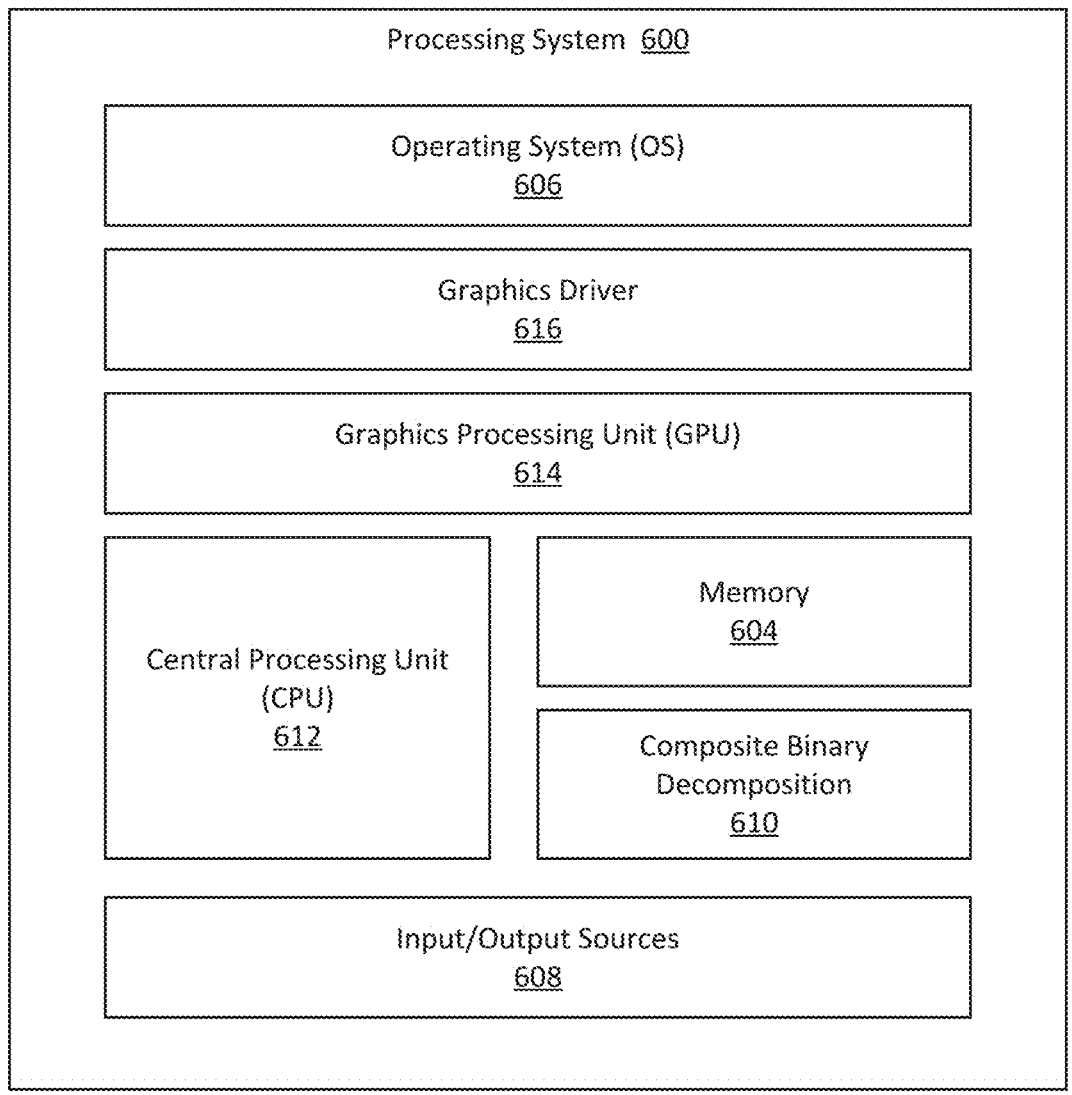
FIG. 6 illustrates composite binary decomposition operation in a processing system according to some embodiments.

FIG. 6 illustrates composite binary decomposition operation in a processing system 600 according to some embodiments. For example, in one embodiment, a composite binary decomposition element or mechanism 610 of FIG. 6 may be employed or hosted by the processing system 600, which may include, for example, computing device 700 of FIG. 7. Processing system 600 represents a communication and data processing device including or representing any number and type of smart devices, such as (without limitation) smart command devices or intelligent personal assistants, home/office automation system, home appliances (e.g., security systems, washing machines, television sets, etc.), mobile devices (e.g., smartphones, tablet computers, etc.), gaming devices, handheld devices, wearable devices (e.g., smart-watches, smart bracelets, etc.), virtual reality (VR) devices, head-mounted display (HMDs), Internet of Things (IoT) devices, laptop computers, desktop computers, server computers, set-top boxes (e.g., Internet based cable television set-top boxes, etc.), global positioning system (GPS)-based devices, etc.

In some embodiments, processing system 600 may include (without limitation) autonomous machines or artificially intelligent agents, such as a mechanical agents or machines, electronics agents or machines, virtual agents or machines, electro-mechanical agents or machines, etc. Examples of autonomous machines or artificially intelligent agents may include (without limitation) robots, autonomous vehicles (e.g., self-driving cars, self-flying planes, self-sailing boats or ships, etc.), autonomous equipment (self-operating construction vehicles, self-operating medical equipment, etc.), and/or the like. Further, "autonomous vehicles" are not limited to automobiles but that they may include any number and type of autonomous machines, such as robots, autonomous equipment, household autonomous devices, and/or the like, and any one or more tasks or operations relating to such autonomous machines may be interchangeably referenced with autonomous driving.

Further, for example, processing system 600 may include a cloud computing platform consisting of a plurality of server computers, where each server computer employs or hosts a multifunction perceptron mechanism. For example, automatic ISP tuning may be performed using component, system, and architectural setups described earlier in this document. For example, some of the aforementioned types of devices may be used to implement a custom learned procedure, such as using field-programmable gate arrays (FPGAs), etc.

Further, for example, processing system 600 may include a computer platform hosting an integrated circuit ("IC"), such as a system on a chip ("SoC" or "SOC"), integrating various hardware and/or software components of computing device 600 on a single chip.

As illustrated, in one embodiment, processing system 600 may include any number and type of hardware and/or software components, such as (without limitation) graphics processing unit 614 ("GPU" or simply "graphics processor"), graphics driver 616 (also referred to as "GPU driver", "graphics driver logic", "driver logic", user-mode driver (UMD), user-mode driver framework (UMDF), or simply "driver"), central processing unit 612 ("CPU" or simply "application processor"), memory 604, network devices, drivers, or the like, as well as input/output (TO) sources 608, such as touchscreens, touch panels, touch pads, virtual or regular keyboards, virtual or regular mice, ports, connectors, etc. Processing system 600 may include operating system (OS) serving as an interface between hardware and/or physical resources of processing system 600 and a user.

It is to be appreciated that a lesser or more equipped system than the example described above may be preferred for certain implementations. Therefore, the configuration of processing system 600 may vary from implementation to implementation depending upon numerous factors, such as price constraints, performance requirements, technological improvements, or other circumstances.

Embodiments may be implemented as any or a combination of: one or more microchips or integrated circuits interconnected using a system board, hardwired logic, software stored by a memory device and executed by a microprocessor, firmware, an application specific integrated circuit (ASIC), and/or a field programmable gate array (FPGA). The terms "logic", "module", "component", "engine", and "mechanism" may include, by way of example, software or hardware and/or a combination thereof, such as firmware.

In one embodiment, composite binary decomposition 610 may be hosted by memory 604 of processing system 600. In another embodiment, composite binary decomposition 610 may be hosted by or be part of operating system 606 of processing system 600. In another embodiment, composite binary decomposition 610 may be hosted or facilitated by graphics driver 616. In yet another embodiment, composite binary decomposition 610 may be hosted by or part of graphics processing unit 614 ("GPU" or simply "graphics processor") or firmware of graphics processor 614. For example, composite binary decomposition 610 may be embedded in or implemented as part of the processing hardware of graphics processor 612. Similarly, in yet another embodiment, composite binary decomposition 610 may be hosted by or part of central processing unit 612 ("CPU" or simply "application processor"). For example, composite binary decomposition 610 may be embedded in or implemented as part of the processing hardware of application processor 612.

In yet another embodiment, composite binary decomposition 610 may be hosted by or part of any number and type of components of processing system 600, such as a portion of composite binary decomposition 610 may be hosted by or part of operating system 606, another portion may be hosted by or part of graphics processor 614, another portion may be hosted by or part of application processor 612, while one or more portions of composite binary decomposition 610 may be hosted by or part of operating system 606 and/or any number and type of devices of computing device 600. It is contemplated that embodiments are not limited to certain implementation or hosting of composite binary decomposition 610 and that one or more portions or components of composite binary decomposition 610 may be employed or implemented as hardware, software, or any combination thereof, such as firmware.

Processing system 600 may host network interface(s) to provide access to a network, such as a LAN, a wide area network (WAN), a metropolitan area network (MAN), a personal area network (PAN), Bluetooth, a cloud network, a mobile network (e.g., 3rd Generation (3G), 4th Generation (4G), 5th Generation (5G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Embodiments may be provided, for example, as a computer program product which may include one or more machine-readable media (including a non-transitory machine-readable or computer-readable storage medium) having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic tape, magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

Figure 7:
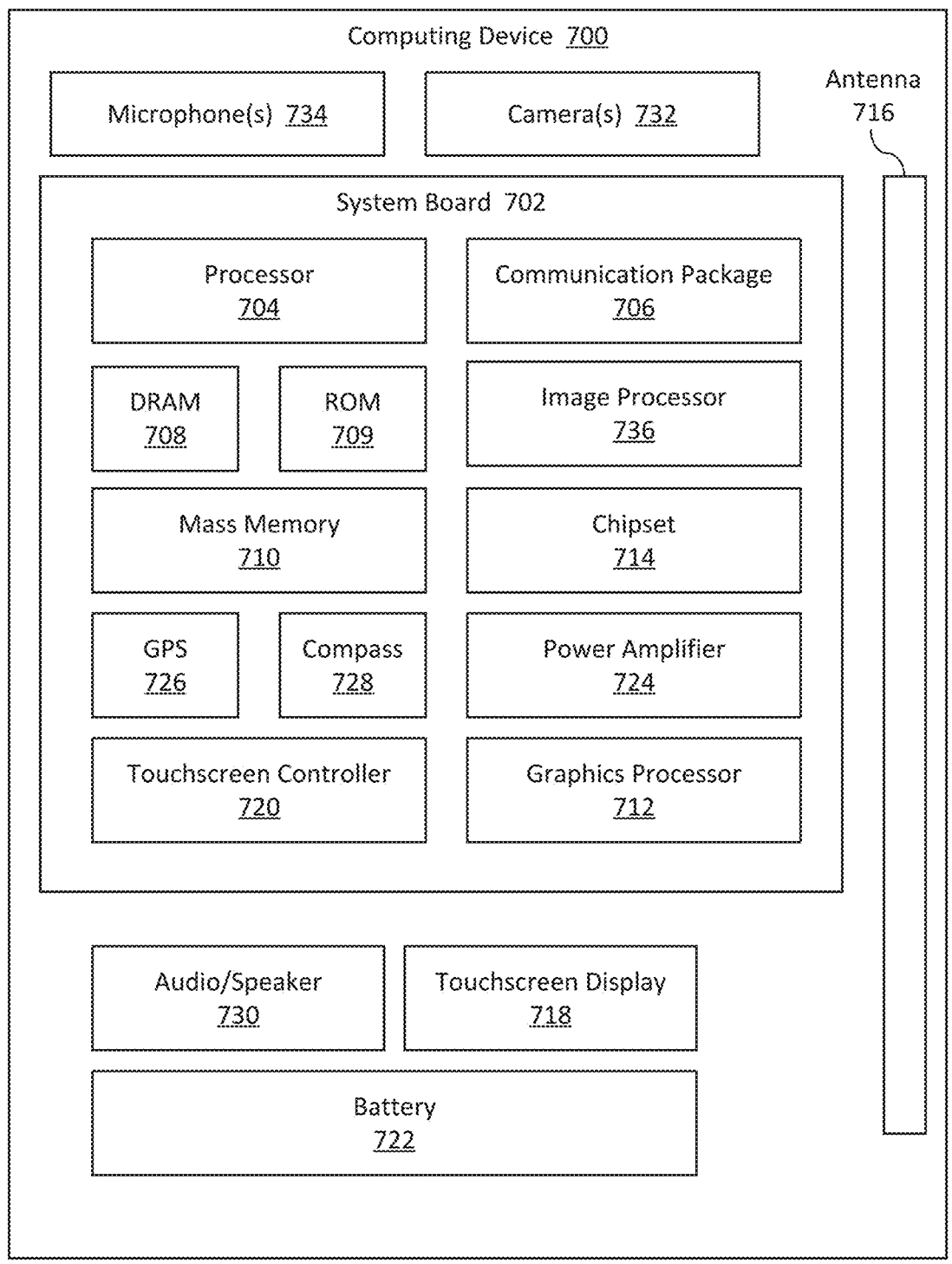
FIG. 7 illustrates a computing device according to some embodiments.

FIG. 7 illustrates a computing device according to some embodiments. It is contemplated that details of computing device 700 may be the same as or similar to details of processing system 600 of FIG. 6 and thus for brevity, certain of the details discussed with reference to processing system 600 of FIG. 6 are not discussed or repeated hereafter. Computing device 700 houses a system board 702 (which may also be referred to as a motherboard, main circuit board, or other terms)). The board 702 may include a number of components, including but not limited to a processor 704 and at least one communication package or chip 706. The communication package 706 is coupled to one or more antennas 716. The processor 704 is physically and electrically coupled to the board 702.

Depending on its applications, computing device 700 may include other components that may or may not be physically and electrically coupled to the board 702. These other components include, but are not limited to, volatile memory (e.g., DRAM) 708, nonvolatile memory (e.g., ROM) 709, flash memory (not shown), a graphics processor 712, a digital signal processor (not shown), a crypto processor (not shown), a chipset 714, an antenna 716, a display 718 such as a touchscreen display, a touchscreen controller 720, a battery 722, an audio codec (not shown), a video codec (not shown), a power amplifier 724, a global positioning system (GPS) device 726, a compass 728, an accelerometer (not shown), a gyroscope (not shown), a speaker or other audio element 730, one or more cameras 732, a microphone array 734, and a mass storage device (such as hard disk drive) 710, compact disk (CD) (not shown), digital versatile disk (DVD) (not shown), and so forth). These components may be connected to the system board 702, mounted to the system board, or combined with any of the other components.

The communication package 706 enables wireless and/or wired communications for the transfer of data to and from the computing device 700. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 706 may implement any of a number of wireless or wired standards or protocols, including but not limited to Wi-Fi (IEEE 802.11 family), WiMAX (IEEE 802.16 family), IEEE 802.20, long term evolution (LTE), Ev-DO (Evolution Data Optimized), HSPA+, HSDPA+, HSUPA+, EDGE Enhanced Data rates for GSM evolution), GSM (Global System for Mobile communications), GPRS (General Package Radio Service), CDMA (Code Division Multiple Access), TDMA (Time Division Multiple Access), DECT (Digital Enhanced Cordless Telecommunications), Bluetooth, Ethernet derivatives thereof, as well as any other wireless and wired protocols that are designated as 3G, 4G, 5G, and beyond. The computing device 700 may include a plurality of communication packages 706. For instance, a first communication package 706 may be dedicated to shorter range wireless communications such as Wi-Fi and Bluetooth and a second communication package 706 may be dedicated to longer range wireless communications such as GSM, EDGE, GPRS, CDMA, WiMAX, LTE, Ev-DO, and others.

The cameras 732 including any depth sensors or proximity sensor are coupled to an optional image processor 736 to perform conversions, analysis, noise reduction, comparisons, depth or distance analysis, image understanding, and other processes as described herein. The processor 704 is coupled to the image processor to drive the process with interrupts, set parameters, and control operations of image processor and the cameras. Image processing may instead be performed in the processor 704, the graphics processor 712, the cameras 732, or in any other device.

In various implementations, the computing device 700 may be a laptop, a netbook, a notebook, an Ultrabook, a smartphone, a tablet, a personal digital assistant (PDA), an ultra-mobile PC, a mobile phone, a desktop computer, a server, a set-top box, an entertainment control unit, a digital camera, a portable music player, or a digital video recorder. The computing device may be fixed, portable, or wearable. In further implementations, the computing device 700 may be any other electronic device that processes data or records data for processing elsewhere.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

Machine Learning—Deep Learning

Figure 8:
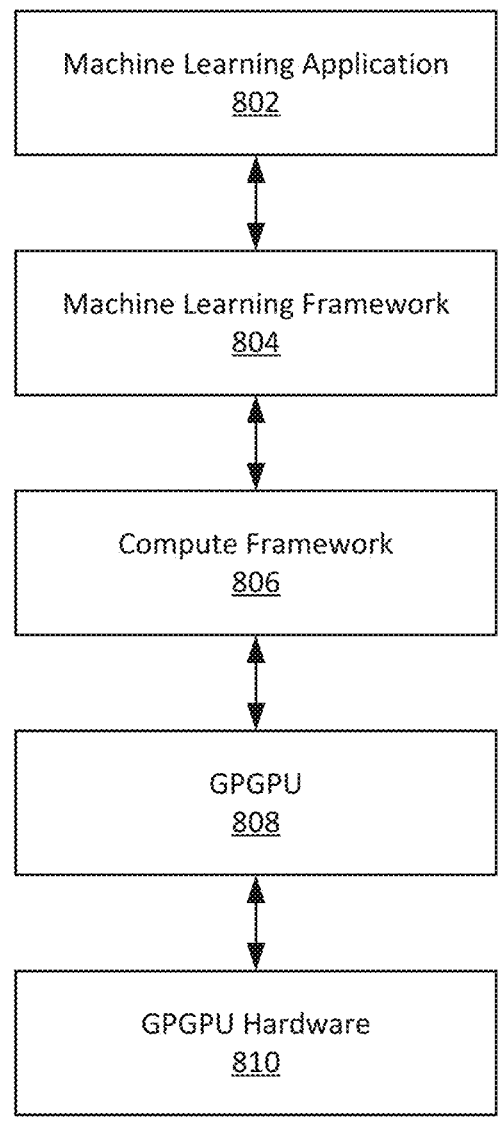
FIG. 8 illustrates a machine learning software stack, according to an embodiment.

FIG. 8 is a generalized diagram of a machine learning software stack 800. FIG. 8 illustrates a software stack for GPGPU operation. However, a machine learning software stack is not limited to this example, and may include, for also, a machine learning software stack for CPU operation.

A machine learning application 802 can be configured to train a neural network using a training dataset or to use a trained deep neural network to implement machine intelligence. The machine learning application 802 can include training and inference functionality for a neural network and/or specialized software that can be used to train a neural network before deployment. The machine learning application 802 can implement any type of machine intelligence including but not limited to image recognition, mapping and localization, autonomous navigation, speech synthesis, medical imaging, or language translation.

Hardware acceleration for the machine learning application 802 can be enabled via a machine learning framework 804. The machine learning framework 804 can provide a library of machine learning primitives. Machine learning primitives are basic operations that are commonly performed by machine learning algorithms. Without the machine learning framework 804, developers of machine learning algorithms would be required to create and optimize the main computational logic associated with the machine learning algorithm, then re-optimize the computational logic as new parallel processors are developed. Instead, the machine learning application can be configured to perform the necessary computations using the primitives provided by the machine learning framework 804. Exemplary primitives include tensor convolutions, activation functions, and pooling, which are computational operations that are performed while training a convolutional neural network (CNN). The machine learning framework 804 can also provide primitives to implement basic linear algebra subprograms performed by many machine-learning algorithms, such as matrix and vector operations.

The machine learning framework 804 can process input data received from the machine learning application 802 and generate the appropriate input to a compute framework 806. The compute framework 806 can abstract the underlying instructions provided to the GPGPU driver 808 to enable the machine learning framework 804 to take advantage of hardware acceleration via the GPGPU hardware 810 without requiring the machine learning framework 804 to have intimate knowledge of the architecture of the GPGPU hardware 810. Additionally, the compute framework 806 can enable hardware acceleration for the machine learning framework 804 across a variety of types and generations of the GPGPU hardware 810.

Machine Learning Neural Network Implementations

The computing architecture provided by embodiments described herein can be configured to perform the types of parallel processing that is particularly suited for training and deploying neural networks for machine learning. A neural network can be generalized as a network of functions having a graph relationship. As is known in the art, there are a variety of types of neural network implementations used in machine learning. One exemplary type of neural network is the feedforward network, as previously described.

A second exemplary type of neural network is the Convolutional Neural Network (CNN). A CNN is a specialized feedforward neural network for processing data having a known, grid-like topology, such as image data. Accordingly, CNNs are commonly used for compute vision and image recognition applications, but they also may be used for other types of pattern recognition such as speech and language processing. The nodes in the CNN input layer are organized into a set of "filters" (feature detectors inspired by the receptive fields found in the retina), and the output of each set of filters is propagated to nodes in successive layers of the network. The computations for a CNN include applying the convolution mathematical operation to each filter to produce the output of that filter. Convolution is a specialized kind of mathematical operation performed by two functions to produce a third function that is a modified version of one of the two original functions. In convolutional network terminology, the first function to the convolution can be referred to as the input, while the second function can be referred to as the convolution kernel. The output may be referred to as the feature map. For example, the input to a convolution layer can be a multidimensional array of data that defines the various color components of an input image. The convolution kernel can be a multidimensional array of parameters, where the parameters are adapted by the training process for the neural network.

Recurrent neural networks (RNNs) are a family of feedforward neural networks that include feedback connections between layers. RNNs enable modeling of sequential data by sharing parameter data across different parts of the neural network. The architecture for a RNN includes cycles. The cycles represent the influence of a present value of a variable on its own value at a future time, as at least a portion of the output data from the RNN is used as feedback for processing subsequent input in a sequence. This feature makes RNNs particularly useful for language processing due to the variable nature in which language data can be composed.

The figures described below present exemplary feedforward, CNN, and RNN networks, as well as describe a general process for respectively training and deploying each of those types of networks. It will be understood that these descriptions are exemplary and non-limiting as to any specific embodiment described herein and the concepts illustrated can be applied generally to deep neural networks and machine learning techniques in general.

The exemplary neural networks described above can be used to perform deep learning. Deep learning is machine learning using deep neural networks. The deep neural networks used in deep learning are artificial neural networks composed of multiple hidden layers, as opposed to shallow neural networks that include only a single hidden layer. Deeper neural networks are generally more computationally intensive to train. However, the additional hidden layers of the network enable multistep pattern recognition that results in reduced output error relative to shallow machine learning techniques.

Deep neural networks used in deep learning typically include a front-end network to perform feature recognition coupled to a back-end network which represents a mathematical model that can perform operations (e.g., object classification, speech recognition, etc.) based on the feature representation provided to the model. Deep learning enables machine learning to be performed without requiring hand crafted feature engineering to be performed for the model. Instead, deep neural networks can learn features based on statistical structure or correlation within the input data. The learned features can be provided to a mathematical model that can map detected features to an output. The mathematical model used by the network is generally specialized for the specific task to be performed, and different models will be used to perform different task.

Once the neural network is structured, a learning model can be applied to the network to train the network to perform specific tasks. The learning model describes how to adjust the weights within the model to reduce the output error of the network. Backpropagation of errors is a common method used to train neural networks. An input vector is presented to the network for processing. The output of the network is compared to the desired output using a loss function and an error value is calculated for each of the neurons in the output layer. The error values are then propagated backwards until each neuron has an associated error value which roughly represents its contribution to the original output. The network can then learn from those errors using an algorithm, such as the stochastic gradient descent algorithm, to update the weights of the of the neural network.

Figure 9A:
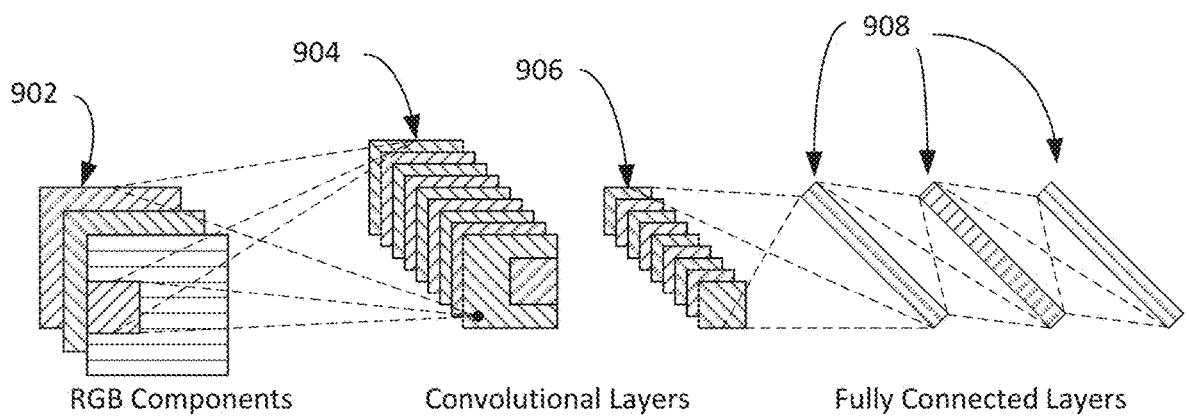
FIGS. 9A-9B illustrate layers of exemplary deep neural networks.
Figure 9B:
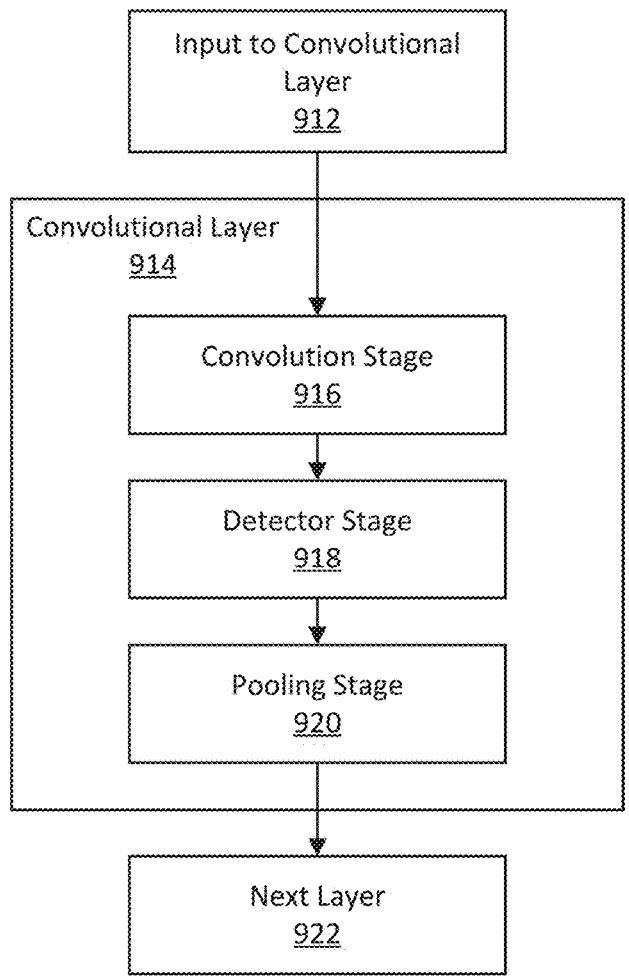

FIGS. 9A-9B illustrate an exemplary convolutional neural network. FIG. 9A illustrates various layers within a CNN. As shown in FIG. 9A, an exemplary CNN used to model image processing can receive input 902 describing the red, green, and blue (RGB) components of an input image. The input 902 can be processed by multiple convolutional layers (e.g., first convolutional layer 904, second convolutional layer 906). The output from the multiple convolutional layers may optionally be processed by a set of fully connected layers 908. Neurons in a fully connected layer have full connections to all activations in the previous layer, as previously described for a feedforward network. The output from the fully connected layers 908 can be used to generate an output result from the network. The activations within the fully connected layers 908 can be computed using matrix multiplication instead of convolution. Not all CNN implementations are make use of fully connected layers 908. For example, in some implementations the second convolutional layer 906 can generate output for the CNN.

The convolutional layers are sparsely connected, which differs from traditional neural network configuration found in the fully connected layers 908. Traditional neural network layers are fully connected, such that every output unit interacts with every input unit. However, the convolutional layers are sparsely connected because the output of the convolution of a field is input (instead of the respective state value of each of the nodes in the field) to the nodes of the subsequent layer, as illustrated. The kernels associated with the convolutional layers perform convolution operations, the output of which is sent to the next layer. The dimensionality reduction performed within the convolutional layers is one aspect that enables the CNN to scale to process large images.

FIG. 9B illustrates exemplary computation stages within a convolutional layer of a CNN. Input to a convolutional layer 912 of a CNN can be processed in three stages of a convolutional layer 914. The three stages can include a convolution stage 916, a detector stage 918, and a pooling stage 920. The convolution layer 914 can then output data to a successive convolutional layer. The final convolutional layer of the network can generate output feature map data or provide input to a fully connected layer, for example, to generate a classification value for the input to the CNN.

In the convolution stage 916 performs several convolutions in parallel to produce a set of linear activations. The convolution stage 916 can include an affine transformation, which is any transformation that can be specified as a linear transformation plus a translation. Affine transformations include rotations, translations, scaling, and combinations of these transformations. The convolution stage computes the output of functions (e.g., neurons) that are connected to specific regions in the input, which can be determined as the local region associated with the neuron. The neurons compute a dot product between the weights of the neurons and the region in the local input to which the neurons are connected. The output from the convolution stage 916 defines a set of linear activations that are processed by successive stages of the convolutional layer 914.

The linear activations can be processed by a detector stage 918. In the detector stage 918, each linear activation is processed by a non-linear activation function. The non-linear activation function increases the nonlinear properties of the overall network without affecting the receptive fields of the convolution layer. Several types of non-linear activation functions may be used. One particular type is the rectified linear unit (ReLU), which uses an activation function defined as $f(x)=\max(0,x)$, such that the activation is thresholded at zero.

The pooling stage 920 uses a pooling function that replaces the output of the second convolutional layer 906 with a summary statistic of the nearby outputs. The pooling function can be used to introduce translation invariance into the neural network, such that small translations to the input do not change the pooled outputs. Invariance to local translation can be useful in scenarios where the presence of a feature in the input data is more important than the precise location of the feature. Various types of pooling functions can be used during the pooling stage 920, including max pooling, average pooling, and 12-norm pooling. Additionally, some CNN implementations do not include a pooling stage. Instead, such implementations substitute and additional convolution stage having an increased stride relative to previous convolution stages.

The output from the convolutional layer 914 can then be processed by the next layer 922. The next layer 922 can be an additional convolutional layer or one of the fully connected layers 908. For example, the first convolutional layer 904 of FIG. 9A can output to the second convolutional layer 906, while the second convolutional layer can output to a first layer of the fully connected layers 908.

The following clauses and/or examples pertain to further embodiments or examples. Specifics in the examples may be applied anywhere in one or more embodiments. The various features of the different embodiments or examples may be variously combined with certain features included and others excluded to suit a variety of different applications. Examples may include subject matter such as a method, means for performing acts of the method, at least one machine-readable medium, such as a non-transitory machine-readable medium, including instructions that, when performed by a machine, cause the machine to perform acts of the method, or of an apparatus or system for facilitating operations according to embodiments and examples described herein.

In some embodiments, a non-transitory computer-readable storage medium having stored thereon executable computer program instructions that, when executed by one or more processors, cause the one or more processors to perform operations including transforming a first neural network into a binary neural network by processing layers of the first neural network in a composite binary decomposition process, the first neural network having floating-point values, the composite binary decomposition process including a composite operation to expand real matrices or tensors of the first neural network into a first group of a plurality of binary matrices or tensors of the binary neural network, and a decompose operation to decompose one or more binary matrices or tensors of the first group into a second group of a plurality of low rank binary matrices or tensors, the binary matrices or tensors of the second group having lower rank than the binary matrices or tensors of the first group.

In some embodiments, the first neural network is a pre-trained neural network.

In some embodiments, the composite binary decomposition process is performed without use of training data.

In some embodiments, the medium further includes instructions for normalizing a weight tensor for each layer of the first neural network.

In some embodiments, the medium further includes instructions for flattening of the normalized weight tensor to generate a matrix of real values for the composite operation.

In some embodiments, the decompose operation includes decomposing a matrix of binary values into a first binary matrix and a second binary matrix, wherein the first binary matrix is a vertically dominant matrix and the second binary matrix is a horizontally dominant matrix.

In some embodiments, the medium further includes instructions for identifying the one or more binary matrices or tensors as sparse binary matrices or tensors to be decomposed into multiple lower rank binary matrices or tensors.

In some embodiments, the composite binary decomposition process includes processing of every layer of the first neural network.

In some embodiments, the first neural network is a convolutional neural network (CNN).

In some embodiments, a method includes obtaining a first neural network, the first neural network having floating point values; and transforming the first neural network into a binary neural network by processing layers of the first neural network in a composite binary decomposition process, the composite binary decomposition process including a composite operation to expand real matrices or tensors of the first neural network into a first group of a plurality of binary matrices or tensors of the binary neural network, and a decompose operation to decompose one or more binary matrices or tensors of the first group into a second group of a plurality of low rank binary matrices or tensors, the binary matrices or tensors of the second group having lower rank than the binary matrices or tensors of the first group.

In some embodiments, the first neural network is a pre-trained neural network.

In some embodiments, the composite binary decomposition process is performed without use of training data.

In some embodiments, the method further includes normalizing a weight tensor for each layer of the first neural network.

In some embodiments, the method further includes flattening of the normalized weight tensor to generate a matrix of real values for the composite operation.

In some embodiments, the decompose operation includes decomposing a matrix of binary values into a first binary matrix and a second binary matrix, wherein the first binary matrix is a vertically dominant matrix and the second binary matrix is a horizontally dominant matrix.

In some embodiments, the one or more binary matrices or tensors of the first group are sparse binary matrices or tensors.

In some embodiments, the composite binary decomposition process includes processing of every layer of the first neural network.

In some embodiments, the first neural network is a convolutional neural network (CNN).

In some embodiments, an apparatus includes one or more processors to process data; and a memory to store data, including data for deep learning processing, wherein the apparatus is to transform a first neural network into a binary network in a composite binary decomposition process, the first neural network having floating point values, the composite binary decomposition process including a composite operation to expand real matrices or tensors of the first neural network into a first group of a plurality of binary matrices or tensors of the binary neural network, and a decompose operation including the apparatus to decompose one or more binary matrices or tensors of the first group into a second group of a plurality of low rank binary matrices or tensors, the binary matrices of tensors of the second group having lower rank than the binary matrices or tensors of the first group.

In some embodiments, the apparatus further includes one or more graphics processing units (GPUs), wherein the one or more GPUs perform the composite binary decomposition process at least in part.

In some embodiments, the apparatus further includes a composite binary decomposition mechanism to support generation of the binary network, to support operation of the binary network, or both.

In some embodiments, the composite binary decomposition mechanism includes an accelerator for generation of the binary network.

In some embodiments, the first neural network is a pre-trained neural network and the apparatus is to perform the composite binary decomposition process without use of training data.

In some embodiments, the decompose operation includes the apparatus to decompose a matrix of binary values into a first matrix and a second matrix, the first matrix being a vertical matrix and the second matrix being a horizontal matrix.

In some embodiments, the one or more binary matrices or tensors of the first group are sparse binary matrices or tensors.

In some embodiments, an apparatus includes means for transforming a first neural network having floating-point values into a binary neural network by processing layers of the first neural network in a composite binary decomposition process, means for transforming the first neural network into a binary neural network including means for expanding real matrices or tensors into a first group of a plurality of binary matrices or tensors of the binary neural network and means for decomposing one or more binary matrices or tensors of the first group into a second group of a plurality of low rank binary matrices or tensors the binary matrices or tensors of the second group having lower rank than the binary matrices or tensors of the first group.

In some embodiments, the first neural network is a pre-trained neural network.

In some embodiments, the composite binary decomposition process is performed without use of training data.

In some embodiments, the apparatus further includes means for normalizing a weight tensor for each layer of the first neural network.

In some embodiments, the apparatus further includes means for flattening of the normalized weight tensor to generate a real matrix for the composite operation.

In some embodiments, the means for decomposing one or more binary matrices or tensors includes means for decomposing a matrix of binary values into a first binary matrix and a second binary matrix, wherein the first binary matrix is a vertically dominant matrix and the second binary matrix is a horizontally dominant matrix.

In some embodiments, the one or more binary matrices or tensors of the first group are sparse binary matrices or tensors.

In some embodiments, the composite binary decomposition process includes processing of every layer of the first neural network.

In some embodiments, the first neural network is a convolutional neural network (CNN).

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer. In some embodiments, a non-transitory computer-readable storage medium has stored thereon data representing sequences of instructions that, when executed by a processor, cause the processor to perform certain operations.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. A non-transitory computer-readable storage medium having stored thereon executable computer program instructions that, when executed by one or more processors, cause the one or more processors to perform operations comprising:

transforming a first neural network into a binary neural network by processing layers of the first neural network in a composite binary decomposition process, the first neural network having floating-point values, the composite binary decomposition process including:

a composite operation to expand real matrices or tensors of the first neural network into a first group of a plurality of binary matrices or tensors of the binary neural network; and a decompose operation to decompose one or more binary matrices or tensors of the first group into a second group of a plurality of low rank binary matrices or tensors, the binary matrices or tensors of the second group having lower rank than the binary matrices or tensors of the first group.

2. The medium of claim 1, wherein the first neural network is a pre-trained neural network.

3. The medium of claim 1, wherein the composite binary decomposition process is performed without use of training data.

4. The medium of claim 1, further comprising executable computer program instructions that, when executed by the one or more processors, cause the one or more processors to perform operations comprising:

normalizing a weight tensor for each layer of the first neural network.

5. The medium of claim 4, further comprising executable computer program instructions that, when executed by the one or more processors, cause the one or more processors to perform operations comprising:

flattening of the normalized weight tensor to generate a matrix of real values for the composite operation.

6. The medium of claim 1, wherein the decompose operation includes decomposing a matrix of binary values into a first binary matrix and a second binary matrix, wherein the first binary matrix is a vertically dominant matrix and the second binary matrix is a horizontally dominant matrix.

7. The medium of claim 1, further comprising executable computer program instructions that, when executed by the one or more processors, cause the one or more processors to perform operations comprising:

identifying the one or more binary matrices or tensors of the first group as sparse binary matrices or tensors to be decomposed into multiple lower rank binary matrices or tensors of the second group.

8. The medium of claim 1, wherein the composite binary decomposition process includes processing of every layer of the first neural network.

9. The medium of claim 1, wherein the first neural network is a convolutional neural network (CNN).

10. A method comprising:
obtaining a first neural network, the first neural network having floating point values; and
transforming the first neural network into a binary neural network by processing layers of the first neural network in a composite binary decomposition process, the composite binary decomposition process including:
a composite operation to expand real matrices or tensors of the first neural network into a first group of a plurality of binary matrices or tensors of the binary neural network; and
a decompose operation to decompose one or more binary matrices or tensors of the first group into a second group of a plurality of low rank binary matrices or tensors, the binary matrices or tensors of the second group having lower rank than the binary matrices or tensors of the first group.

11. The method of claim 10, wherein the first neural network is a pre-trained neural network.

12. The method of claim 10, wherein the composite binary decomposition process is performed without use of training data.

13. The method of claim 10, further comprising:
normalizing a weight tensor for each layer of the first neural network.

14. The method of claim 13, further comprising:
flattening of the normalized weight tensor to generate a matrix of real values for the composite operation.

15. The method of claim 10, wherein the decompose operation includes decomposing a matrix of binary values into a first binary matrix and a second binary matrix, wherein the first binary matrix is a vertically dominant matrix and the second binary matrix is a horizontally dominant matrix.

16. The method of claim 10, wherein the one or more binary matrices or tensors of the first group are sparse binary matrices or tensors.

17. The method of claim 10, wherein the composite binary decomposition process includes processing of every layer of the first neural network.

18. The method of claim 10, wherein the first neural network is a convolutional neural network (CNN).

19. An apparatus comprising:
one or more processors to process data; and
a memory to store data, including data for deep learning processing;
wherein the apparatus is to transform a first neural network into a binary neural network in a composite binary decomposition process, the first neural network having floating point values, the composite binary decomposition process including:
a composite operation to expand real matrices or tensors of the first neural network into a first group of a plurality of binary matrices or tensors of the binary neural network; and
a decompose operation including the apparatus to decompose one or more binary matrices or tensors of the first group into a second group of a plurality of low rank binary matrices or tensors, the binary matrices or tensors of the second group having lower rank than the binary matrices or tensors of the first group.

20. The apparatus of claim 19, further comprising one or more graphics processing units (GPUs), wherein the one or more GPUs perform the composite binary decomposition process at least in part.

21. The apparatus of claim 19, further comprising a composite binary decomposition mechanism to support generation of the binary neural network, to support operation of the binary neural network, or both.

22. The apparatus of claim 21, wherein the composite binary decomposition mechanism includes an accelerator for generation of the binary neural network.

23. The apparatus of claim 19, wherein the first neural network is a pre-trained neural network and wherein the apparatus is to perform the composite binary decomposition process without use of training data.

24. The apparatus of claim 19, wherein the decompose operation includes the apparatus to decompose a matrix of binary values into a first matrix and a second matrix, the first matrix being a vertical matrix and the second matrix being a horizontal matrix.

25. The apparatus of claim 19, wherein the one or more binary matrices or tensors of the first group are sparse binary matrices or tensors.

* * * * *